(12) United States Patent
Yoshino et al.

(10) Patent No.: US 10,352,356 B2
(45) Date of Patent: Jul. 16, 2019

(54) FOIL BEARING

(71) Applicant: NTN CORPORATION, Osaka (JP)

(72) Inventors: Masato Yoshino, Mie (JP); Hiroki Fujiwara, Mie (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/772,123

(22) PCT Filed: Nov. 4, 2016

(86) PCT No.: PCT/JP2016/082886
§ 371 (c)(1),
(2) Date: Apr. 30, 2018

(87) PCT Pub. No.: WO2017/086190
PCT Pub. Date: May 26, 2017

(65) Prior Publication Data
US 2018/0313401 A1 Nov. 1, 2018

(30) Foreign Application Priority Data

Nov. 19, 2015 (JP) ................................. 2015-226413

(51) Int. Cl.
F16C 17/02 (2006.01)
F16C 27/02 (2006.01)
(Continued)

(52) U.S. Cl.
CPC ............ *F16C 17/024* (2013.01); *F16C 27/02* (2013.01); *F16C 32/0614* (2013.01);
(Continued)

(58) Field of Classification Search
CPC ........ F16C 17/024; F16C 27/02; F16C 43/02; F16C 37/002; F16C 32/0614; F16C 2360/24
(Continued)

(56) References Cited

U.S. PATENT DOCUMENTS 4,178,046 A * 12/1979 Silver ................... F16C 17/024
384/103
6,135,640 A * 10/2000 Nadjafi ................. F16C 17/024
310/90.5
(Continued)

FOREIGN PATENT DOCUMENTS

JP 09088950 A * 3/1997 .............. F16C 27/02
JP 2015-143572 8/2015
(Continued)

OTHER PUBLICATIONS

International Search Report dated Jan. 24, 2017 in International (PCT) Application No. PCT/JP2016/082886.
(Continued)

*Primary Examiner* — Marcus Charles
(74) *Attorney, Agent, or Firm* — Wenderoth, Lind & Ponack, L.L.P.

(57) ABSTRACT

A foil bearing includes a foil holder and a plurality of foils fixed to the foil holder and arrayed in a circumferential direction. Each of the foils includes a top foil portion having a bearing surface, an extending portion formed on one circumferential side of the top foil portion, an underfoil portion formed on another circumferential side of the top foil portion, and an insertion slot formed between the top foil portion and the underfoil portion in the circumferential direction. The insertion slot includes a positioning portion and a wide portion that is larger in circumferential width than the positioning portion and is opened to an end portion of each of the foils. An edge of the top foil portion, which is opposed to the wide portion, retreats toward the one circumferential side with respect to an edge opposed to the positioning portion.

4 Claims, 7 Drawing Sheets

(51) Int. Cl.
*F16C 43/02* (2006.01)
*F16C 32/06* (2006.01)
*F16C 37/00* (2006.01)

(52) U.S. Cl.
CPC ............ *F16C 37/002* (2013.01); *F16C 43/02* (2013.01); *F16C 2360/24* (2013.01)

(58) Field of Classification Search
USPC .................................. 384/103–104, 106, 114
See application file for complete search history.

(56) References Cited

U.S. PATENT DOCUMENTS

| 9,033,579 B2* | 5/2015 | Yoshino | F16C 17/042 384/105 |
| 2006/0018574 A1* | 1/2006 | Kang | F16C 17/024 384/106 |
| 2014/0219590 A1* | 8/2014 | Omori | F16C 32/06 384/106 |
| 2014/0226925 A1* | 8/2014 | Yoshino | F16C 17/024 384/103 |
| 2015/0337894 A1* | 11/2015 | Yoshino | F16C 17/024 384/103 |

FOREIGN PATENT DOCUMENTS

| WO | WO-2013042713 A1 * | 3/2013 | ............ F16C 17/024 |
| WO | WO-2016158359 A1 * | 10/2016 | ............ F16C 17/024 |

OTHER PUBLICATIONS

International Preliminary Report on Patentability and Written Opinion of the International Searching Authority dated May 22, 2018 in International (PCT) Application No. PCT/JP2016/082886.

* cited by examiner

FOIL BEARING

The present application is a U.S. National Phase application of International (PCT) Application No. PCT/JP2016/082886, filed on Nov. 4, 2016, which claims priority to Japanese Application No. 2015-226413, filed on Nov. 19, 2015.

TECHNICAL FIELD

The present invention relates to a foil bearing.

BACKGROUND ART

Attention has been focused on a foil bearing as a bearing configured to support a shaft of a turbo machine such as a gas turbine or a turbocharger. The foil bearing has bearing surfaces formed of flexible thin films (foils) having low flexural rigidity, and is configured to support a load by allowing the bearing surfaces to be deflected. During rotation of the shaft, fluid films (such as air films) are formed between the shaft and the foils, and the shaft is supported in a non-contact state. In this case, the foils of the foil bearing are flexible, and hence appropriate bearing gaps are automatically formed in accordance with operating conditions such as a rotation speed of the shaft, a load on the shaft, and an ambient temperature. Therefore, the foil bearing is excellent in stability, and hence can be used at higher speed in comparison with general air dynamic pressure bearings.

For example, in Patent Literature 1 below, a foil bearing 100 as illustrated in FIG. 10 is disclosed. The foil bearing 100 includes a foil holder 110 having a cylindrical shape, and a plurality of foils 120 fixed to an inner peripheral surface 111 of the foil holder 110. As illustrated in FIG. 11, each foil 120 includes a top foil portion 121 having a bearing surface, extending portions 122 formed on one circumferential side of the top foil portion 121, and an underfoil portion 123 formed on another circumferential side of the top foil portion 121. Slits 124 are formed at a boundary between the top foil portion 121 and the underfoil portion 123 of each foil 120. The extending portions 122 of each foil 120 are inserted into the slits 124 of another foil 120 (see FIG. 12), and, further, are inserted into each groove 114 formed in the inner peripheral surface 111 of the foil holder 110 (see FIG. 10). The underfoil portion 123 of each foil 120 is arranged between the top foil portion 121 of the another foil 120 and the inner peripheral surface 111 of the foil holder 110, and supports the top foil portion 121 from behind (from a radially outer side).

CITATION LIST

Patent Literature 1: JP 2015-143572 A

SUMMARY OF INVENTION

Technical Problem

In Patent Literature 1 described above, as another example of the foil 120, there is disclosed a configuration as illustrated in FIG. 13 in which the slits 124 are opened to axial end portions of the foil 120. According to investigation conducted by the inventor of the present invention, it was found that, when such foils 120 were used, abnormal abrasion was caused in regions in the vicinities of the slits 124 in the top foil portion 121 (dotted regions P in FIG. 13). The reason thereof is as follows. That is, when the extending portions 122 of the another foil 120 are inserted into the slits 124 of each foil 120, as illustrated in FIG. 14, an edge 121a of the top foil portion 121, which faces to the slits 124, overrides the extending portions 122. With this, as illustrated in FIG. 15 in an exaggerated manner, the edge 121a of the top foil portion 121 is gradually raised toward an outer side in the axial direction, and the regions P raised in this manner are held in sliding contact with the shaft excessively, with the result that abnormal abrasion may be caused.

For example, it is conceivable that, in the foil 120 illustrated in FIG. 13 and FIG. 14, when a circumferential width W' of each of the slits 124 is increased, a raising amount of the edge 121a of the top foil portion 121 can be suppressed. However, the slits 124 of each foil 120 are engaged in the circumferential direction with the extending portions 122 of the another foil 120 inserted into the slits 124, and thus can exert a function of positioning both the foils with respect to each other in the circumferential direction. Therefore, when the circumferential width W' of each of the slits 124 is increased excessively, a relative movement amount of each foil 120 in the circumferential direction is increased. As a result, there is a fear in that positioning accuracy in the circumferential direction is degraded and a bearing performance is deteriorated.

The problems described above may arise not only in the radial foil bearing configured to support the shaft in the radial direction, but also in a thrust foil bearing configured to support the shaft (thrust collar) in thrust directions in a similar manner.

In view of the above-mentioned circumstances, it is an object of the present invention to prevent abnormal abrasion of foils without deteriorating a bearing performance of a foil bearing.

Solution to Problem

In order to achieve the above-mentioned object, according to one embodiment of the present invention, there is provided a foil bearing, comprising: a foil holder; and a plurality of foils fixed to the foil holder so as to be arrayed in a circumferential direction of the foil bearing, each of the foils comprising: a top foil portion having a bearing surface; an extending portion formed on one circumferential side of the top foil portion; an underfoil portion formed on another circumferential side of the top foil portion and arranged between the top foil portion of another of the foils and the foil holder; and an insertion slot formed between the top foil portion and the underfoil portion in the circumferential direction, into which the extending portion of the another of the foils is inserted, the insertion slot comprising: a positioning portion to be engaged with the extending portion of the another of the foils in the circumferential direction; and a wide portion that is larger in circumferential width than the positioning portion and is opened to an end portion of the each of the foils, in which an edge of the top foil portion, which faces to the wide portion of the insertion slot, is retreated toward the one circumferential side with respect to an edge of the top foil portion, which faces to the positioning portion of the insertion slot.

As described above, the positioning portion having a relatively small circumferential width is formed in the insertion slot, and the positioning portion and the extending portion of the another of the foils are engaged with each other in the circumferential direction. Thus, relative movement of each of the foils in the circumferential direction can be prevented. Further, the edge of the top foil portion, which faces to the wide portion of the insertion slot, is retreated toward the one circumferential side with respect to the edge of the top foil portion, which faces to the positioning portion of the insertion slot. Thus, a region of the top foil portion (dotted regions P in FIG. 13 and FIG. 15), which is to be raised excessively when the extending portion of the another of the foils is inserted into the insertion slot, is eliminated. With this, raising of the top foil portion is prevented to avoid such a situation that the top foil portion is excessively pressed against a shaft, thereby being capable of preventing abnormal abrasion of the foils.

In the above-mentioned foil bearing, it is preferred that the edge of the top foil portion, which faces to the wide portion of the insertion slot, be inclined with respect to a direction orthogonal to the circumferential direction (an axial direction in a case of a radial foil bearing, a radial direction in a case of a thrust foil bearing). In particular, it is preferred that the edge of the top foil portion, which faces to the wide portion of the insertion slot, be formed by a curve line that projects toward the another circumferential side. With this, raising of the top foil portion can be prevented while preventing reduction in area of the top foil portion (that is, the area of the bearing surface).

Advantageous Effects of Invention

As described above, according to the present invention, raising of the top foil portion is prevented while preventing deterioration in bearing performance by securing the relative positioning accuracy of each of the foils in the circumferential direction. In this manner, abnormal abrasion of the foils can be prevented.

DESCRIPTION OF EMBODIMENTS

Now, a radial foil bearing is described as an example of a foil bearing according to the present invention with reference to FIG. 1 to FIG. 9.

Figure 1:
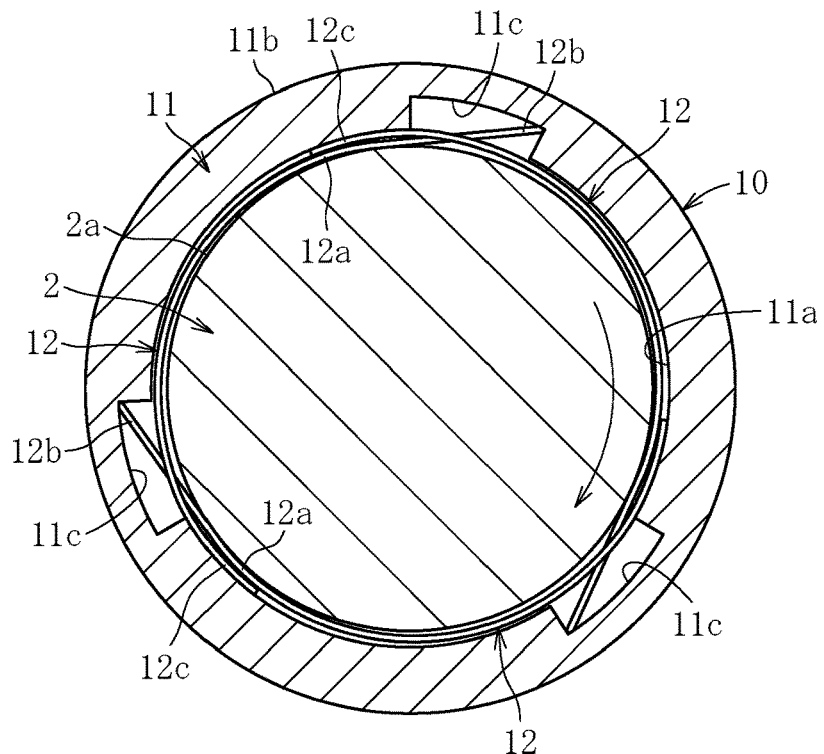
FIG. 1 is a sectional view of a foil bearing (radial foil bearing) according to an embodiment of the present invention.

In FIG. 1, a radial foil bearing 10 according to an embodiment of the present invention is illustrated. The radial foil bearing 10 is configured to support a shaft 2, which is a rotary member inserted along an inner periphery thereof, in a radial direction with a fluid film formed between the radial foil bearing 10 and the shaft 2. The radial foil bearing 10 according to this embodiment is an air dynamic pressure bearing that uses air as a pressure generating fluid. The radial foil bearing 10 comprises a foil holder 11 having a tubular shape (cylindrical shape in the illustrated example), and a plurality of foils 12 (three foils 12 in the illustrated example) mounted to an inner peripheral surface of the foil holder 11. A downstream side in a rotation direction of the shaft 2 (downstream side in the arrow direction in FIG. 1) is hereinafter referred to as "one circumferential side", and an upstream side in the rotation direction of the shaft 2 (upstream side in the arrow direction in FIG. 1) is hereinafter referred to as "another circumferential side".

The foil holder 11 is made of a metal or a resin. As the metal for forming the foil holder 11, there are given, for example, sintered metal and ingot (for example, steel). The foil holder 11 has a tubular shape, and has an inner peripheral surface 11a and an outer peripheral surface 11b each having a cylindrical surface shape in the illustrated example. The outer peripheral surface 11b of the foil holder 11 is fixed to an inner peripheral surface of a housing (not shown). Axial grooves 11c being recessed portions into which end portions of the foils 12 are inserted are formed in the inner peripheral surface 11a of the foil holder 11 at a plurality of positions (three positions in the illustrated example) spaced apart from each other in the circumferential direction. Both axial ends of each of the axial grooves 11c are opened to end surfaces of the foil holder 11, respectively. On one axial end or both axial ends of each of the axial grooves 11c, there may be formed a locking portion, which is to be engaged with each of the foils 12 so as to regulate movement of each of the foils 12 in the axial direction. The locking portions may be formed integrally with or separately from the foil holder 11.

Each of the foils 12 is made of a metal that is excellent in resiliency and processability, such as a steel material or a copper alloy. Each of the foils 12 is formed by subjecting a metal foil having a thickness of from approximately 20 μm to approximately 200 μm to press working or electrical discharge machining. As in this embodiment, in the air dynamic pressure bearing that uses air as a fluid film, a lubricating oil does not exist in an atmosphere. Thus, it is preferred that the metal foil be made of stainless steel or bronze.

Figure 2:
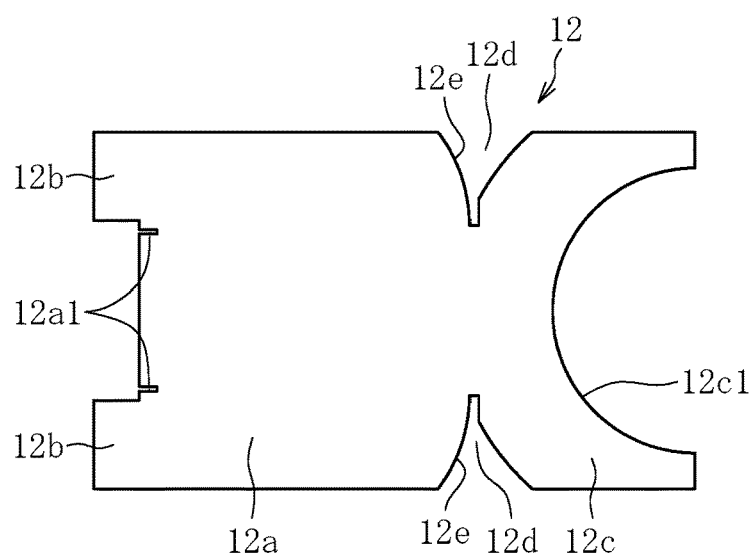
FIG. 2 is a plan view of a foil provided in the above-mentioned radial foil bearing.

As illustrated in FIG. 2, each of the foils 12 comprises a top foil portion 12a, extending portions 12b formed on one circumferential side (left side in FIG. 2) of the top foil portion 12a, and an underfoil portion 12c formed on another circumferential side (right side in FIG. 2) of the top foil portion 12a.

A surface of the top foil portion 12a on the radially inner side functions as a bearing surface (see FIG. 1). In this embodiment, all of surfaces of the respective foils 12, which are directly opposed to an outer peripheral surface 2a of the shaft 2, are the top foil portions 12a. Minute circumferential slits 12a1 are formed at the vicinities of both axial ends of an edge of the top foil portion 12a on the downstream side in the rotation direction of the shaft (see FIG. 2). The slits 12a1 may be omitted unless otherwise necessary.

The extending portions 12b extend from the top foil portion 12a toward the one circumferential side (left side in FIG. 2). The extending portions 12*b* are formed on axial end portions of each of the foils 12 (both axial ends in the illustrated example). In this embodiment, each of the extending portions 12*b* has a rectangular shape.

The underfoil portion 12*c* extends from the top foil portion 12*a* toward the another circumferential side (right side in FIG. 2). In the illustrated example, an axial width of the underfoil portion 12*c* is equal to an axial width of the top foil portion 12*a*. However, the axial width of the underfoil portion 12*c* and the axial width of the top foil portion 12*a* may be set to be slightly different from each other. For example, the axial width of the underfoil portion 12*c* may be set to be slightly smaller than the axial width of the top foil portion 12*a*. A cutout portion 12*c*1 having an axial width gradually reduced toward the one circumferential side is formed at an edge of the underfoil portion 12*c* on the another circumferential side. In the illustrated example, the cutout portion 12*c*1 is formed into a substantially arc shape. Besides, the cutout portion 12*c*1 may be formed into a substantially V-shape in which the straight line is bent at the axial center. Further, the cutout portion 12*c*1 may be omitted unless otherwise necessary, and the edge of the underfoil portion 12*c* on the another circumferential side may be formed as a straight line parallel to the axial direction.

Insertion slots 12*d* into which the extending portions 12*b* of the adjacent foil 12 are inserted are formed at a boundary between the top foil portion 12*a* and the underfoil portion 12*c*. The insertion slots 12*d* are formed at the same axial positions as the extending portions 12*b*. In the illustrated example, the insertion slots 12*d* are formed at both axial ends of the foil 12. An axial width of each of the insertion slots 12*d* is slightly larger than an axial width of each of the extending portions 12*b* to be inserted into the insertion slots 12*d*. The insertion slots 12*d* are opened to axial end portions of the foil 12, respectively.

Figure 3:
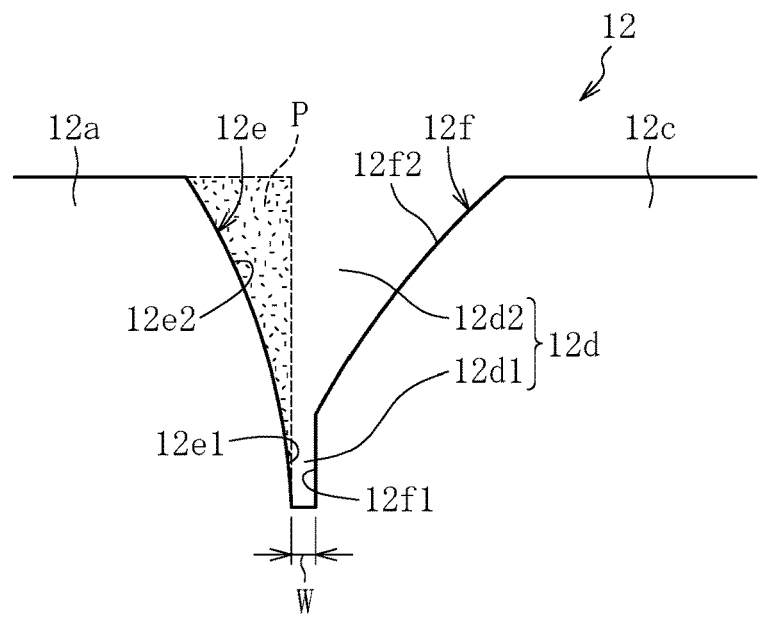
FIG. 3 is an enlarged view of the foil of FIG. 2.

As illustrated in FIG. 3 in an enlarged manner, the insertion slot 12*d* comprises a positioning portion 12*d*1 provided on the inner side in the axial direction, and a wide portion 12*d*2, which is provided so as to be adjacent to the positioning portion 12*d*1 on the outer side in the axial direction, and has a circumferential width larger than that of the positioning portion 12*d*1. When a circumferential width W of the positioning portion 12*d*1 (minimum circumferential width) is excessively large, a positioning accuracy of the foil 12 in the circumferential direction is deteriorated. When the circumferential width W is excessively small, the extending portion 12*b* of another foil 12 is difficult to be inserted. Therefore, the circumferential width of the positioning portion 12*d*1 is set so as not to cause such troubles.

In an edge 12*e* of the top foil portion 12*a* on the another circumferential side (that is, an edge opposed to the insertion slots 12*d*), a region 12*e*2 on the outer side in the axial direction, which faces to the wide portion 12*d*2 of the insertion slot 12*d*, is retreated toward the one circumferential side (left side in FIG. 3) with respect to a region 12*e*1 on the inner side in the axial direction, which faces to the positioning portion 12*d*1 of the insertion slot 12*d*. In this embodiment, the edge 12*e* of the top foil portion 12*a* is inclined with respect to the axial direction, specifically, is inclined to the one circumferential side toward the outer side in the axial direction. In the illustrated example, the edge 12*e* of the top foil portion 12*a* is formed by a curve line (for example, an arc) that projects toward the another circumferential side.

In an edge 12*f* of the underfoil portion 12*c* on the one circumferential side (that is, an edge opposed to the insertion slot 12*d*), a region 12*f*2 on the outer side in the axial direction, which faces to the wide portion 12*d*2 of the insertion slot 12*d*, is retreated toward the another circumferential side (right side in FIG. 3) with respect to a region 12*f*1 on the inner side in the axial direction, which faces to the positioning portion 12*d*1 of the insertion slot 12*d*. In this embodiment, the edge 12*f* of the underfoil portion 12*c* comprises the straight line portion 12*f*1, which is provided on the inner side in the axial direction, and is parallel to the axial direction, and the inclined portion 12*f*2, which is provided so as to be adjacent to the straight line portion 12*f*1 on the outer side in the axial direction, and is inclined to the another circumferential side toward the outer side in the axial direction.

Figure 4:
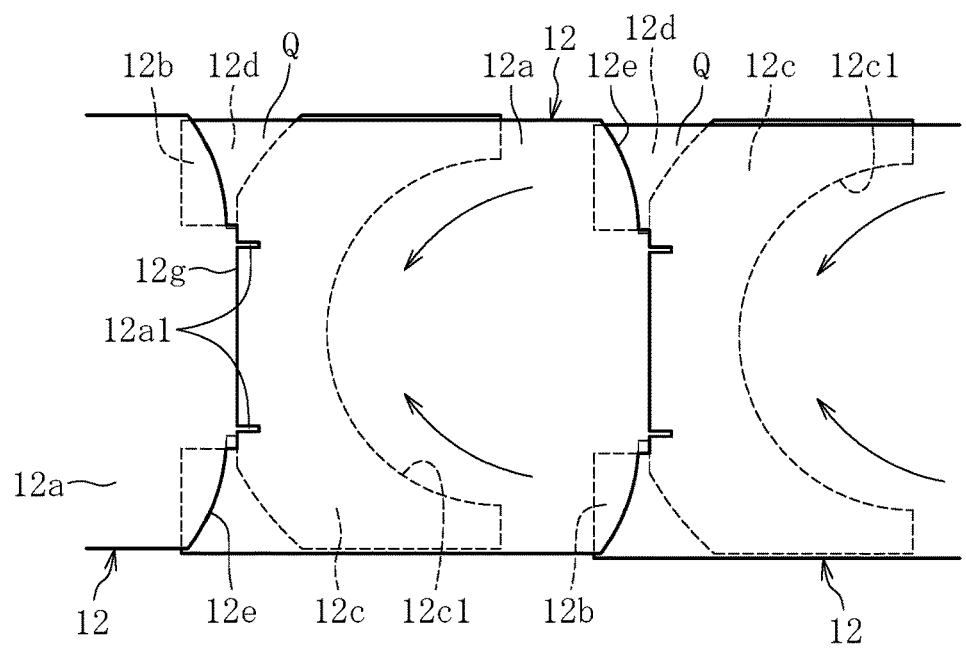
FIG. 4 is a developed plan view of a plurality of coupled foils.

The extending portions 12*b* of each foil 12 are inserted into the insertion slots 12*d* of the foil 12 adjacent thereto on the one circumferential side (see FIG. 4). With this, the extending portions 12*b* of each foil 12 and the edges 12*e* and 12*f* of the another foil 12, which are opposed to the insertion slots 12*d*, are engaged with each other in the circumferential direction. Thus, circumferential movement of each foil 12 relative to the another foil 12 is regulated. Further, the extending portions 12*b* of each foil 12 are inserted into each of the axial grooves 11*c* in the inner peripheral surface 11*a* of the foil holder 11 (see FIG. 1). With this, circumferential movement of each foil 12 relative to the foil holder 11 is regulated. In FIG. 4, for the sake of easy understanding, the foils 12 are slightly shifted in the axial direction.

The underfoil portion 12*c* of each foil 12 is arranged between the top foil portion 12*a* of the foil 12 adjacent thereto on the another circumferential side and the inner peripheral surface 11*a* of the foil holder 11. The end portion of the underfoil portion 12*c* on the another circumferential side is arranged at a circumferentially intermediate portion of the top foil portion 12*a*, which is overlaid on the underfoil portion 12*c*. With this, a region of the top foil portion 12*a* on the one circumferential side is supported from behind by the underfoil portion 12*c* of the another foil 12, and a region of the top foil portion 12*a* on the another circumferential side is not supported by the underfoil portion 12*c* of the another foil 12, and is held in contact with the inner peripheral surface 11*a* of the foil holder 11. The edges 12*g* on the one circumferential side and the edges 12*e* on the another circumferential side of the top foil portions 12*a* of the adjacent foils 12 are engaged with and pressed against each other in the circumferential direction. With this, the top foil portions 12*a* of the respective foils 12 are protruded radially outward, and are curved to form a shape conforming to the inner peripheral surface 11*a* of the foil holder 11.

When the shaft 2 is rotated in the arrow direction in FIG. 1, a radial bearing gap is formed between the radially inner surface (bearing surface) of the top foil portion 12*a* of each of the foils 12 of the radial foil bearing 10 and the outer peripheral surface 2*a* of the shaft 2. At this time, the region of the top foil portion 12*a*, which is located on the one circumferential side, overrides the underfoil portion 12*c* of the adjacent foil to be curved so that the radial bearing gap has a wedge-like shape narrowed toward the one circumferential side (on the downstream side in the rotation direction of the shaft). When air is pushed into the narrowed side of such radial bearing gap having a wedge-like shape, a pressure of an air film of the radial bearing gap is increased, and the increased pressure causes the shaft 2 to be supported in a non-contact state in the radial direction.

At this time, due to flexibility of the foils 12, the bearing surface of each of the foils 12 is suitably deformed in accordance with operating conditions such as a load, a rotation speed of the shaft 2, and an ambient temperature.

Thus, the radial bearing gap is automatically adjusted so as to have an appropriate width in accordance with the operating conditions. As a result, even under severe conditions involving high temperature and high speed rotation, the radial bearing gap may be managed so as to have an optimum width, and hence the shaft 2 may be stably supported. During rotation of the shaft 2, due to friction with a fluid (air) flowing along with rotation of the shaft 2, the foils 12 are pushed toward the downstream side in the rotation direction to be brought into abutment against corner portions of the axial grooves 11c of the foil holder 11.

In this embodiment, in the edge 12e of the top foil portion 12a, the region 12e2 on the outer side in the axial direction is retreated toward the one circumferential side with respect to the region 12e1 on the inner side in the axial direction. With this, regions of the top foil portion 12a, which are to be raised excessively when the extending portions 12b of the another foil 12 are inserted into the insertion slots 12d (dotted region P in FIG. 3), are eliminated. With this, raising of the edge 12e of the top foil portion 12a is prevented to avoid such a situation that the top foil portion 12a is excessively pressed against the outer peripheral surface 2a of the shaft 2, thereby being capable of preventing abnormal abrasion of the bearing surface of the top foil portion 12a.

Further, in this embodiment, in the edge 12f of the underfoil portion 12c on the one circumferential side, the region 12f2 on the outer side in the axial direction is retreated toward the another circumferential side with respect to the region 12f1 on the inner side in the axial direction. In this case, as illustrated in FIG. 4, the insertion slots 12d of the adjacent foil 12 are arranged behind regions Q of the top foil portion 12a, which are adjacent to the extending portions 12b. That is, the regions Q are not supported by the underfoil portion 12c of the adjacent foil 12 from behind, and are directly opposed to the inner peripheral surface 11a of the foil holder 11. The regions Q of the top foil portion 12a, which are adjacent to the extending portions 12b, are deformed in conformity with the extending portions 12b inserted into the axial groove 11c of the foil holder 11, and hence are liable to be projected toward the radially inner side. In view of this, the underfoil portion 12c is not provided behind the regions Q adjacent to the extending portions 12b as described above. Thus, the support stiffness of the regions Q is reduced so that the regions Q are easily deformed toward the radially outer side due to a pressure of an air film, thereby being capable of avoiding excessive contact between the regions Q and the shaft 2.

Further, in this embodiment, as illustrated in FIG. 2, the cutout portion 12c1 is formed at the edge of the underfoil portion 12c on the another circumferential side, and hence a step along the cutout portion 12c1 is formed on the top foil portion 12a that overrides the underfoil portion 12c. With this, a fluid flowing along the top foil portion 12a flows along the above-mentioned step to be collected to the axial center side, thereby enhancing an effect of increasing the pressure (see the arrows in FIG. 4). In particular, the minute slits 12a1 are formed at the vicinities of both the axial ends of the edge of the top foil portion 12a on the one circumferential side, and thus the stiffness of the portion is reduced. Accordingly, the top foil portion 12a is easily deformed along the cutout portion 12c1 of the underfoil portion 12c arranged behind the top foil portion 12a.

Further, the foils 12 are not completely fixed to the foil holder 11, and are movable with respect to the foil holder 11. Therefore, during rotation of the shaft 2, due to an influence of the air film formed in the radial bearing gap, the foils 12 are pushed against the foil holder 11. Along with this, slight sliding occurs between each of the foils 12 and the foil holder 11, in particular, between the radially outer surfaces of the top foil portion 12a and the underfoil portion 12c of each of the foils 12 and the inner peripheral surface 11a of the foil holder 11. Due to frictional energy generated by the slight sliding, vibration of the shaft 2 can be damped.

During the low speed rotation immediately before the stop or immediately after the actuation of the shaft 2, the bearing surface of each of the foils 12 and the outer peripheral surface of the shaft 2 come into sliding contact with each other. Thus, low-friction coating such as a DLC film, a titanium aluminum nitride film, a tungsten disulfide film, and a molybdenum disulfide film may be formed on one or both of the bearing surface of each of the foils 12 and the outer peripheral surface of the shaft 2. Further, in order to adjust a friction force generated by slight sliding between the foils 12 and the foil holder 11, the low-friction coating as described above may be formed on one or both of the foils 12 and the foil holder 11.

The present invention is not limited to the embodiment described above. Now, description is made of other embodiments of the present invention. Description overlapping with the embodiment described above is omitted.

Figure 5:
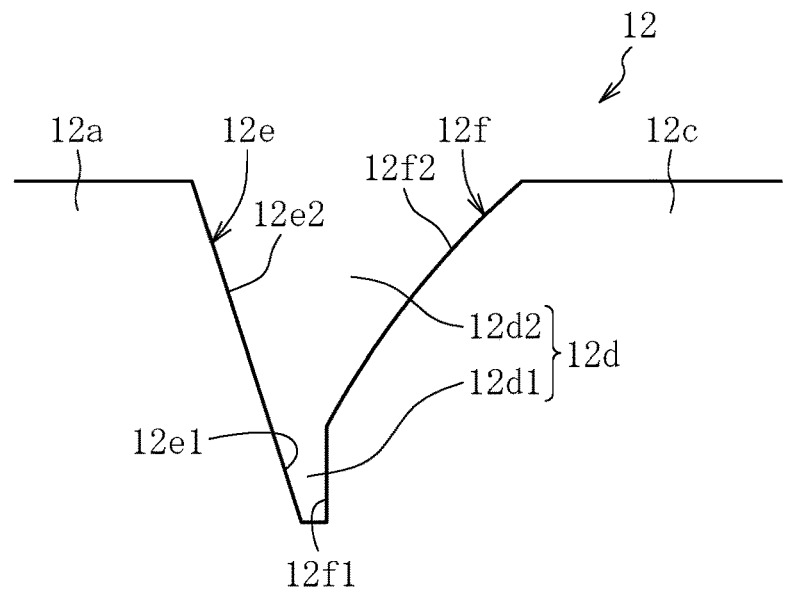
FIG. 5 is an enlarged plan view of a foil of another example.

In an embodiment of the present invention, which is illustrated in FIG. 5, the edge 12e of the top foil portion 12a on the another circumferential side is formed by a straight line inclined to the one circumferential side toward the outer side in the axial direction. In the edge 12e having a straight line shape, the region 12e1 on the inner side in the axial direction faces to the positioning portion 12d1 of the insertion slot 12d, and the region 12e2 on the outer side in the axial direction faces to the wide portion 12d2 of the insertion slot 12d.

Figure 6:
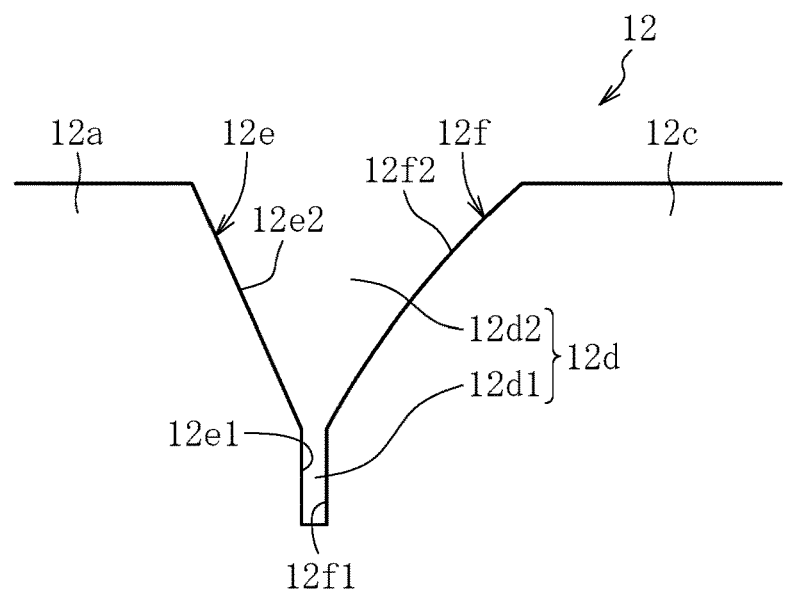
FIG. 6 is an enlarged plan view of a foil of another example.
Figure 7:
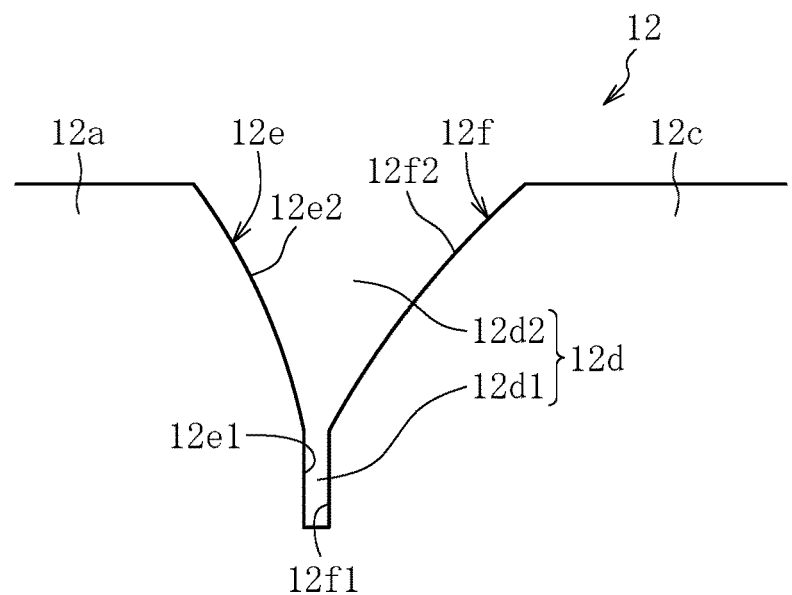
FIG. 7 is an enlarged plan view of a foil of another example.

In embodiments of the present invention, which are illustrated in FIG. 6 and FIG. 7, in the edge 12e of the top foil portion 12a on the another circumferential side, the region 12e1 on the inner side in the axial direction is formed by a straight line parallel to the axial direction, and the region 12e2 on the outer side in the axial direction is inclined with respect to the axial direction. In the example illustrated in FIG. 6, the region 12e2 on the outer side in the axial direction is formed by a straight line inclined to the one circumferential side toward the outer side in the axial direction. In the example illustrated in FIG. 7, the region 12e2 on the outer side in the axial direction is formed by a curve line that projects toward the another side in the axial direction. In those embodiments, the region 12e1 on the inner side in the axial direction in the edge 12e of the top foil portion 12a and the region 12f1 on the inner side in the axial direction in the edge 12f of the underfoil portion 12c are each formed by the straight line parallel to the axial direction. Thus, a circumferential width of the positioning portion 12d1 formed therebetween in the circumferential direction is constant in the axial direction. With this, the positioning portion 12d1 and the extending portion 12b of the another foil 12, which is inserted thereinto, are easily engaged with each other in the circumferential direction so that the adjacent foils 12 can easily be positioned with respect to each other.

Figure 8:
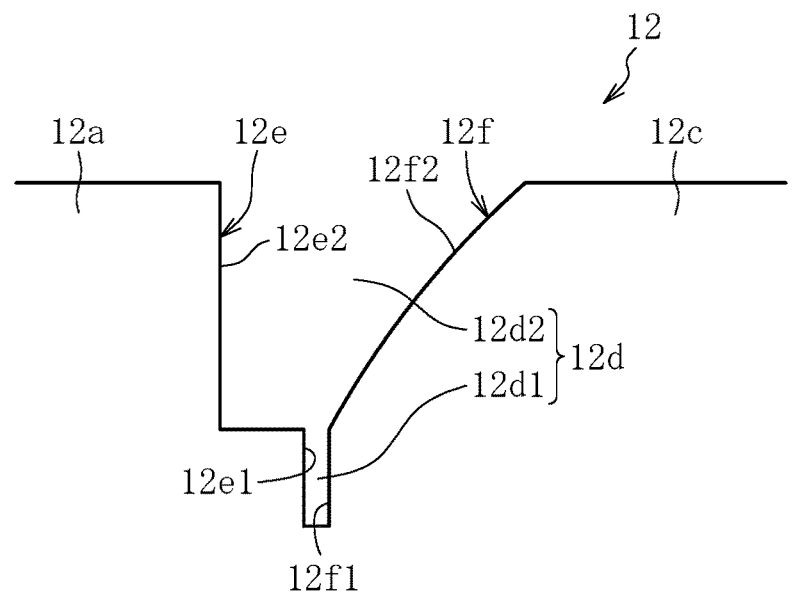
FIG. 8 is an enlarged plan view of a foil of another example.

In an embodiment of the present invention, which is illustrated in FIG. 8, in the edge 12e of the top foil portion 12a on the another circumferential side, the region 12e2 on the outer side in the axial direction and the region 12e1 on the inner side in the axial direction are each formed by a straight line parallel to the axial direction, and a step in the circumferential direction is formed therebetween. In this case, as compared to the embodiments described above, an eliminated region of the top foil portion 12a is increased, and hence an effect of preventing raising of the top foil portion 12a is enhanced. However, on the other hand, the area of the top foil portion 12a, that is, the area of the bearing surface is reduced, thereby causing a fear in that the bearing stiffness is reduced. Therefore, in order to exert both the effect of preventing raising of the top foil portion 12a and the effect of preventing reduction in bearing surface in a balanced manner, it is preferred that the edge 12e of the top foil portion 12a on the another circumferential side (in particular, the region 12e2 on the outer side in the axial direction) be inclined with respect to the axial direction as in the embodiments described above.

Incidentally, when the shaft 2 vibrates in a conical mode, both axial end portions of the top foil portion 12a of each foil 12, in particular, both axial end portions of an overlapping portion with the underfoil portion 12c of the another foil 12 in the top foil portion 12a of each foil 12 are held in contact with the outer peripheral surface 2a of the shaft 2, with the result that the foils 12 may be damaged.

Figure 9:
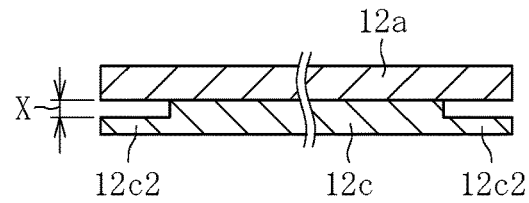
FIG. 9 is a sectional view of foils of another example.
Figure 10:
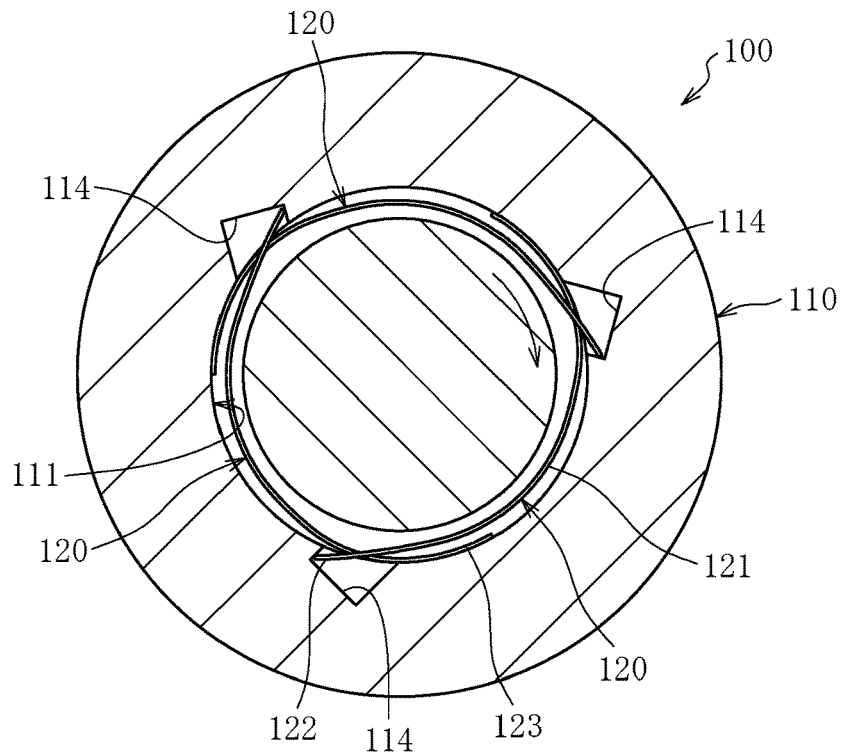
FIG. 10 is a sectional view of a related-art foil bearing.
Figure 11:
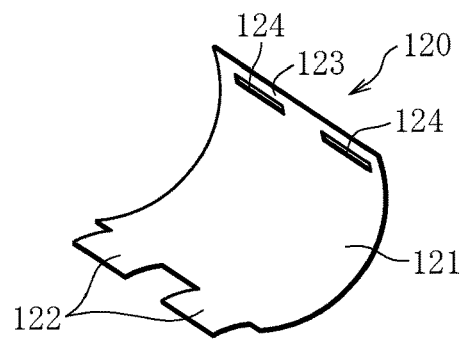
FIG. 11 is a perspective view of a foil provided in the foil bearing of FIG. 10.
Figure 12:
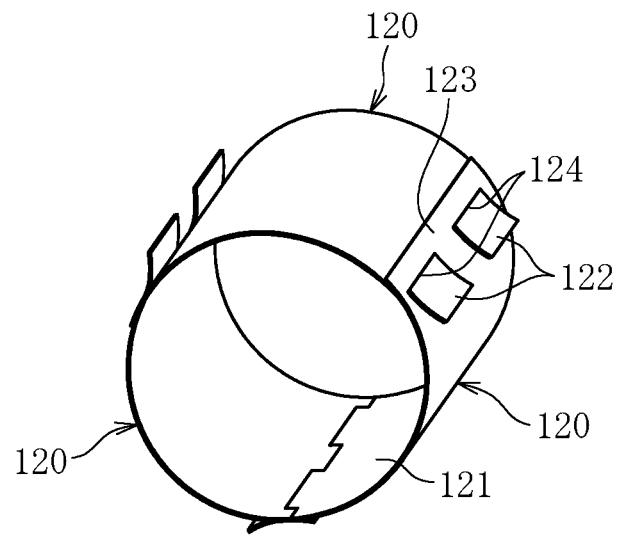
FIG. 12 is a perspective view for illustrating a state in which the foils of FIG. 11 are coupled.
Figure 13:
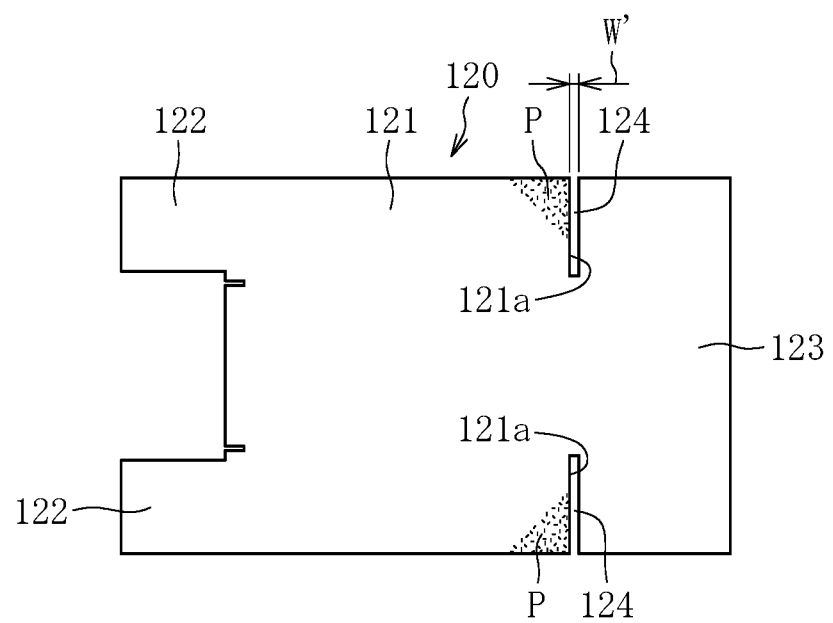
FIG. 13 is a plan view of another example of a related-art foil.
Figure 14:
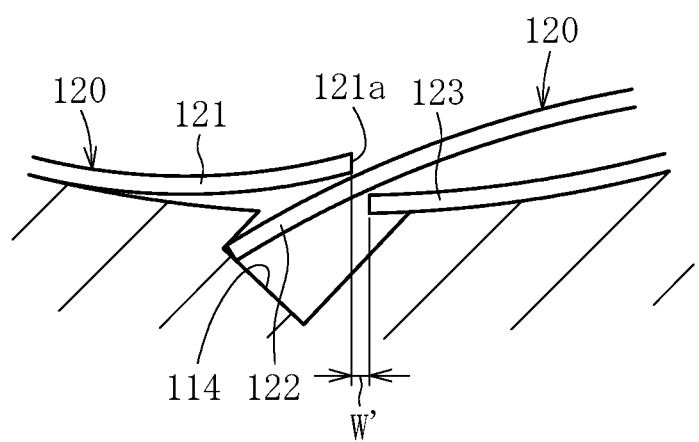
FIG. 14 is a sectional view of a foil bearing including the foils of FIG. 13.
Figure 15:
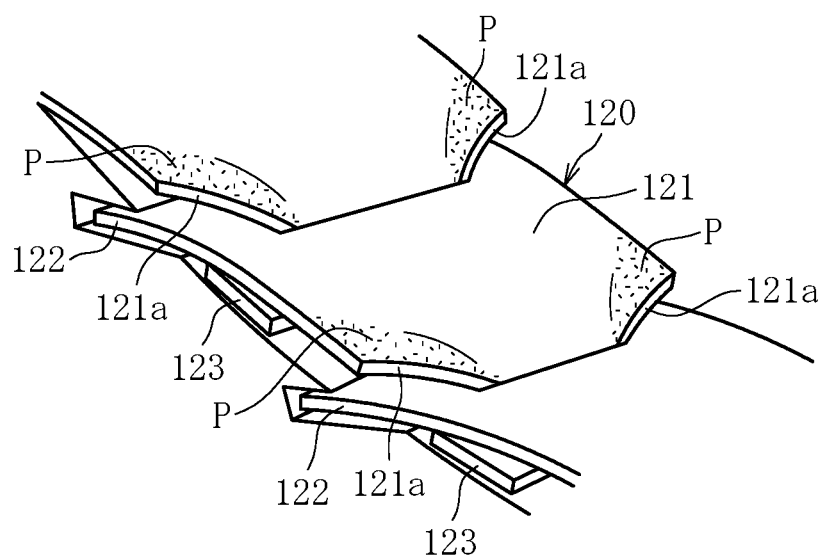
FIG. 15 is a developed perspective view for illustrating a state in which the foils of FIG. 13 are coupled.

In view of this, a thin portion may be formed on any one or both of the axial end portions of the overlapping portion of the top foil portion 12a and the underfoil portion 12c. For example, in an embodiment of the present invention, which is illustrated in FIG. 9, thin portions 12c2 that are thinner than the other region are formed on both the axial end portions of the underfoil portion 12c. The thin portions 12c2 are formed on both the axial end portions of the underfoil portion 12c as described above, and thus, correspondingly to an amount X by which the underfoil portion 12c is thinned, the top foil portion 12a can be released to the radially outer side. With this, the stiffness of both the axial ends of the top foil portion 12a is reduced, thereby being capable of reducing a pressure of contact with the outer peripheral surface 2a of the shaft 2. Thus, damage to the foils 12 can be prevented.

In the illustrated example, the thin portions 12c2 are formed by forming the steps on the radially inner surface of the underfoil portion 12c, but the present invention is not limited thereto. For example, thin portions may be formed by forming steps on both axial end portions of the radially outer surface of the underfoil portion 12c or both axial end portions of the radially outer surface of the top foil portion 12a. Further, those thin portions may be combined with each other. For example, the thin portions may be formed on both the underfoil portion 12c and the top foil portion 12a by forming steps on both the axial end portions of the radially inner surface of the underfoil portion 12c and both the axial end portions of the radially outer surface of the top foil portion 12a opposed to the underfoil portion 12c. Further, in the illustrated example, the thickness of the thin portion 12c2 is constant. However, the present invention is not limited thereto, and, for example, the thin portion may be gradually thinned toward the axial end portion side.

The thin portion 12c2 of the underfoil portion 12c as described above may be formed by, for example, press working or rolling processing. Further, the thin portion 12c2 of the underfoil portion 12c may be formed, for example, at the same time when the foil 12 is punched out from a metal thin plate being a material or before the foil 12 is punched out.

Further, in the embodiments described above, in the edge 12f of the underfoil portion 12c in the one circumferential side, the region 12f2 on the outer side in the axial direction is inclined. However, the region may be formed by a straight line parallel to the axial direction, which is continuous from the region 12f1 on the inner side in the axial direction.

Further, in the embodiments described above, description is made of the case in which the circumferential width of the opening portion of each of the axial grooves 11c formed in the inner peripheral surface 11a of the foil holder 11 is relatively large. However, the present invention is not limited thereto. For example, slit-like axial grooves each having an opening portion that is small in circumferential width may be formed in the inner peripheral surface of the foil holder, and the end portions of the foils may be inserted into the axial grooves. Such axial grooves may be formed by, for example, wire cutting.

In the embodiments described above, as the embodiments of the present invention, the radial foil bearing 10 configured to support the shaft 2 in the radial direction is described. However, the present invention is not limited thereto. The present invention is applicable to a thrust foil bearing configured to support the shaft 2 in thrust directions.

The thrust foil bearing comprises a disc-like foil holder, and a plurality of foils fixed to an end surface of the foil holder so as to be arrayed in the circumferential direction. Each of the foils comprises a top foil portion having a bearing surface, extending portions formed on one circumferential side of the top foil portion, and an underfoil portion formed on another circumferential side of the top foil portion. The underfoil portion of each of the foils is arranged between the top foil portion of another of the foils and the end surface of the foil holder. Insertion slots are formed between the top foil portion and the underfoil portion of each of the foils in the circumferential direction, and the extending portions of the another of the foils are inserted into the insertion slots. The extending portions and the insertion slots are formed, for example, on both end portions in a radial direction of each of the foils. The insertion slots each comprise a positioning portion to be engaged with each of the extending portions of the another of the foils in the circumferential direction, and a wide portion that is larger in circumferential width than the positioning portion and is opened to the end portion of each of the foils in the radial direction. An edge of the top foil portion, which faces to the wide portion of the insertion slot, is retreated toward the one circumferential side with respect to an edge of the top foil portion, which faces to the positioning portion of the insertion slot.

When the shaft 2 is rotated, a thrust bearing gap having a wedge-like shape is formed between the bearing surface of the top foil portion of each of the foils of the thrust foil bearing and an end surface of the thrust collar provided on the shaft 2. When air is pushed into a narrowed side of the thrust bearing gap having a wedge-like shape, a pressure of an air film of the thrust bearing gap is increased, and the increased pressure causes the shaft 2 and the thrust collar to be supported in a non-contact state in the thrust directions.

A function and a modification example of components of the thrust foil bearing are similar to those of the above-mentioned radial foil bearing 10, and hence description thereof is omitted.

The foil bearing according to the present invention is applicable to, and is preferably used as, for example, a bearing configured to support a turbine shaft of a gas turbine or a bearing configured to support a rotor of a turbocharger (supercharger). Further, the foil bearing according to the present invention may be used not only for turbo machines such as the gas turbine and the turbocharger, but widely used also as bearings for vehicles in which use of oil is restricted and bearings for industrial devices.

The foil bearings described above are each an air dynamic pressure bearing that uses air as a pressure generating fluid.

However, the present invention is not limited thereto, and other gases or liquids such as water and oil may be used as the pressure generating fluid.

REFERENCE SIGNS LIST 2 shaft
10 radial foil bearing (foil bearing)
11 foil holder
12 foil
12a top foil portion
12b extending portion
12c underfoil portion
12d insertion slot
12d1 positioning portion
12d2 wide portion
12e edge
12e1 region on inner side in axial direction (edge opposed to positioning portion of insertion slot)
12e2 region on outer side in axial direction (edge opposed to wide portion of insertion slot)

The invention claimed is:

1. A foil bearing, comprising:
a foil holder; and
a plurality of foils fixed to the foil holder so as to be arrayed in a circumferential direction of the foil bearing,
each of the foils comprising:
    a top foil portion having a bearing surface;
    an extending portion formed on one circumferential side of the top foil portion;
    an underfoil portion formed on another circumferential side of the top foil portion and arranged between the top foil portion of another of the foils and the foil holder; and
    an insertion slot formed between the top foil portion and the underfoil portion in the circumferential direction, into which the extending portion of the another of the foils is inserted,
the insertion slot comprising:
    a positioning portion to be engaged with the extending portion of the another of the foils in the circumferential direction; and
    a wide portion that is larger in circumferential width than the positioning portion and is opened to an end portion of the each of the foils,
wherein an edge of the top foil portion, which faces to the wide portion of the insertion slot, is retreated toward the one circumferential side with respect to an edge of the top foil portion, which faces to the positioning portion of the insertion slot.

2. The foil bearing according to claim 1, wherein the edge of the top foil portion, which faces to the wide portion of the insertion slot, is inclined with respect to a direction orthogonal to the circumferential direction.

3. The foil bearing according to claim 2, wherein the edge of the top foil portion, which faces to the wide portion of the insertion slot, is formed by a curve line that projects toward the another circumferential side.

4. A foil, which is provided in a foil bearing, comprising:
a top foil portion having a bearing surface;
an extending portion formed on one circumferential side of the top foil portion;
an underfoil portion formed on another circumferential side of the top foil portion and arranged behind the top foil portion of another foil; and
an insertion slot formed between the top foil portion and the underfoil portion in a circumferential direction, into which the extending portion of the another foil is inserted,
the insertion slot comprising:
    a positioning portion; and
    a wide portion that is larger in circumferential width than the positioning portion and is opened to an end portion of the foil,
wherein an edge of the top foil portion, which faces to the wide portion of the insertion slot, is retreated toward the one circumferential side with respect to an edge of the top foil portion, which faces to the positioning portion of the insertion slot.

* * * * *